United States Patent
Satoh et al.

(10) Patent No.: US 7,594,809 B2
(45) Date of Patent: Sep. 29, 2009

(54) MOLDING DIE UNIT

(75) Inventors: Sadaki Satoh, Tokyo (JP); Masashi Gotoh, Tokyo (JP); Ken Kikuchi, Tokyo (JP); Takeshi Itoh, Tokyo (JP); Takuo Kataho, Tokyo (JP)

(73) Assignee: TDK Corporation, Tokyo (JP)

( * ) Notice: Subject to any disclaimer, the term of this patent is extended or adjusted under 35 U.S.C. 154(b) by 492 days.

(21) Appl. No.: 11/655,068

(22) Filed: Jan. 19, 2007

(65) Prior Publication Data

US 2007/0178184 A1 Aug. 2, 2007

(30) Foreign Application Priority Data

Jan. 27, 2006 (JP) .............. 2006-019523

(51) Int. Cl.
*B29C 43/36* (2006.01)
(52) U.S. Cl. .............. 425/414; 425/406; 425/412; 425/193; 425/195; 425/352
(58) Field of Classification Search ............ 425/182, 425/183, 184, 186, 190, 191, 192 R, 193, 425/195, 198, 517, 382 R, 406, 410, 464, 425/412, 414, 468, 352; 164/339
See application file for complete search history.

(56) References Cited

U.S. PATENT DOCUMENTS

| | | | | |
|---|---|---|---|---|
| 4,197,067 A * | 4/1980 | Dore | | 425/78 |
| 5,074,352 A * | 12/1991 | Suzuki | | 164/97 |
| 5,378,416 A * | 1/1995 | Kishi et al. | | 264/40.5 |
| 5,786,002 A * | 7/1998 | Dean et al. | | 425/183 |
| 6,213,750 B1 * | 4/2001 | Dean et al. | | 425/183 |
| 6,402,493 B1 * | 6/2002 | Matsubara et al. | | 425/78 |
| 6,923,239 B2 * | 8/2005 | Cagle et al. | | 164/5 |
| 7,086,847 B2 * | 8/2006 | Dean et al. | | 425/190 |
| 7,156,631 B2 * | 1/2007 | Ozeki | | 425/78 |
| 7,229,267 B2 * | 6/2007 | Meier | | 425/182 |
| 2004/0207108 A1 * | 10/2004 | Pacchiana et al. | | 264/109 |

FOREIGN PATENT DOCUMENTS

| FR | 2548089 A3 * | 1/1985 |
|---|---|---|
| JP | 01210200 A * | 8/1989 |
| JP | B2 3444922 | 9/2003 |
| JP | A 2004-298894 | 10/2004 |

* cited by examiner

*Primary Examiner*—Philip C Tucker
*Assistant Examiner*—Dimple N Bodawala
(74) *Attorney, Agent, or Firm*—Oliff & Berridge, PLC

(57) ABSTRACT

A molding die unit has a shell and a die. The die is located inside the shell. A die hole is formed in the die. The die has first and second portions. The first and second portions include their respective surfaces defining the die hole and facing each other. A first through hole is formed in the shell and penetrates so as to open in an outside surface and in an inside surface of the shell. A second through hole continuing to the first through hole is formed at a position corresponding to the first through hole and in the first portion. The second through hole includes a first region and a second region. The first region opens in a surface of the first portion facing the inside surface of the shell and has a first sectional area. The second region opens in the surface defining the die hole and has a second sectional area smaller than the first sectional area.

4 Claims, 8 Drawing Sheets

MOLDING DIE UNIT

BACKGROUND OF THE INVENTION

1. Field of the Invention

The present invention relates to a molding die unit.

2. Related Background Art

A conventional die assembly for powder compacting is one having a cylindrical die unit in which a die hole is formed, and columnar upper and lower punches arranged to slide along an inside surface of the die unit. In this die assembly for powder compacting, powder is filled into a cavity space created by the die unit, the lower surface of the upper punch, and the upper surface of the lower punch, and the powder is pressed by the upper punch and lower punch to form a powder compact.

Japanese Patent No. 3444922 (Japanese Patent Application Laid-Open No. 6-246497) describes a method of forming a lateral hole in the powder compact by pressing the powder in a state in which a lateral pin is inserted in the cavity space and through the die unit in the direction normal to the pressing direction.

SUMMARY OF THE INVENTION

The die unit described in the foregoing Japanese Patent is provided with a through hole which is formed so as to penetrate from an outside surface of the die unit to a surface defining the die hole, in order to permit the lateral pin to slide in the direction normal to the pressing direction by the upper and lower punches. However, since the die unit is made of a hard material such as cemented carbide so as to be resistant to the large pressure of several-ton level exerted by the upper and lower punches, it is difficult to form the aforementioned hole by machining. Particularly, machining of a small hole with the diameter of not more than several millimeters is extremely difficult and the machining accuracy of the hole degrades.

The present invention has been accomplished in order to solve the above problem and an object of the invention is to improve machinability of the through hole opening in the outside surface of the molding die unit and in the surface defining the die hole.

A molding die unit according to the present invention is a molding die unit comprising: a shall; and a die which is located inside the shall and in which a die hole is formed; wherein the die has first and second portions comprising respective surfaces defining the die hole and facing each other; wherein a first through hole is formed in the shall and penetrates the shall so as to open in an outside surface and in an inside surface; wherein a second through hole continuing to the first through hole is formed in the first portion; and wherein the second through hole comprises a first region which opens in a surface of the first portion facing the inside surface of the shall and which has a first sectional area, and a second region which opens in the surface defining the die hole and which has a second sectional area smaller than the first sectional area.

Since in the molding die unit of the present invention the second through hole comprises the first region and the second region smaller than the sectional area of the first region, a machining length for forming the second region is smaller than a distance between the outside surface of the die and the surface defining the die hole. Therefore, an improvement is made in machinability of the through hole opening in the outside surface of the die unit and in the surface defining the die hole.

The first portion and the second portion forming the die comprise their respective surfaces defining the die hole and facing each other. For fabricating the die, the first portion and the second portion each are machined. This permits us to machine the second region of the second through hole in the first portion from the inside surface of the die (the surface defining the die hole and facing the counter surface), whereby the second region of the second through hole can be readily machined.

Preferably, the die is located inside the shall by shrinkage fit. This permits each of the portions forming the die to be fixed without deviation against pressure during molding. Therefore, it becomes feasible to securely maintain the shape of the die hole.

Preferably, the first and second portions further comprise respective surfaces which define the die hole, which are perpendicular to the aforementioned surfaces facing each other, and which face each other; the first portion is comprised of a first member comprising one of the two surfaces defining the die hole, and a second member comprising the other of the two surfaces defining the die hole; the second portion is comprised of a third member comprising one of the two surfaces defining the die hole, and a fourth member comprising the other of the two surfaces defining the die hole; the first and third members have their respective projections each of which comprises the one surface; the first to fourth members are fitted in the shall by shrinkage fit in a state in which each of the projections is sandwiched between the other surfaces.

Since the first to fourth members forming the die are shrinkage-fitted in the shall in the state in which each of the projections of the first and third members is sandwiched between the other surfaces, the members are fixed to each other without deviation of position. For this reason, the accurate die hole can be formed by the members forming the die.

Since each projection is sandwiched between the surfaces, the corners of the die hole are formed by the surfaces and the end faces of the projections. For this reason, the corners of the die hole are formed more accurately than in a case where the corners of the die hole are formed by a single member or in a case where the corners of the die hole are formed by corners of members.

Preferably, a sectional shape of the first region is an oblong; the second through hole comprises a plurality of second regions; the plurality of second regions are arranged along a major axis direction of the oblong being the sectional shape of the first region. This achieves efficient arrangement of the second regions.

The present invention successfully achieves an improvement in machinability of the through hole opening in the outside surface of the molding die unit and in the surface defining the die hole.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The best mode for carrying out the present invention will be described below in detail with reference to the accompanying drawings. The same elements will be denoted by the same reference symbols in the description of the drawings, without redundant description.

Figure 1:
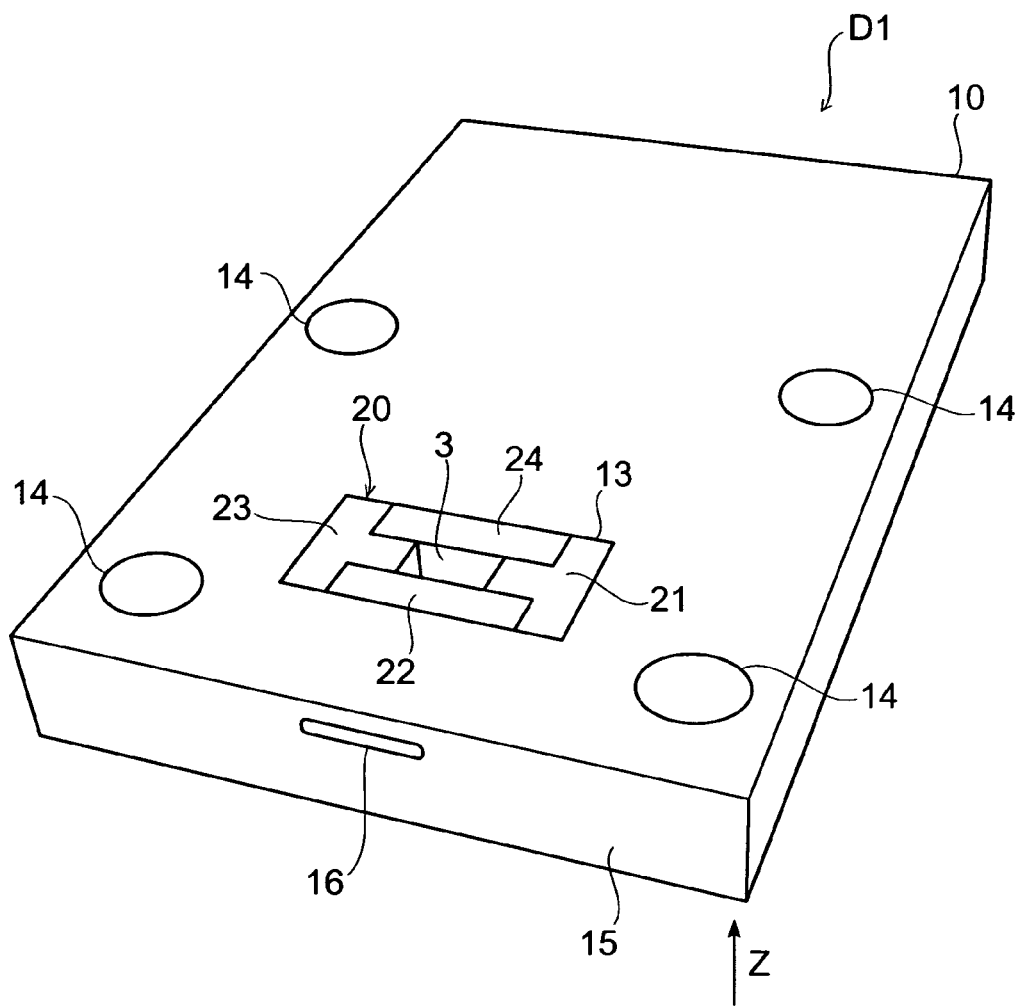
FIG. 1 is a perspective view of a die unit according to an embodiment of the present invention.

FIG. 1 is a perspective view of a die unit according to an embodiment of the present invention. The die unit D1 according to the present embodiment is a female die for powder compacting. The die unit D1 has a contour of a rectangular parallelepiped shape. A die hole 3 of a quadrangular cross section is formed in the die unit D1 and penetrates the die unit D1 in the thickness direction. The die hole 3 is defined by four surfaces. Each of the surfaces defining the die hole 3 is perpendicular to its adjoining surfaces and parallel to the corresponding outside surface of the die unit D1. In the description hereinafter, the depth direction of the die hole 3 is defined as a Z-direction.

The contour of the die unit D1 has the longitudinal length of about 118 mm, the lateral length of about 75 mm, and the maximum thickness of about 18 mm. The die hole 3 has the length of about 6 mm in the longitudinal direction of the die unit, the length of about 11 mm in the lateral direction of the die unit, and the depth of about 10 mm. The die unit D1 has a shell 10 and a die 20. The die 20 is located inside the shell 10 and the die hole 3 is formed therein. The shell 10 is made of die steel, mold steel, or the like. The die 20 is made of a material harder than the shell 10, and, for example, is made of cemented carbide, gem, or the like.

A contour of the shell 10 is of a rectangular parallelepiped shape and forms the contour of the die unit D1. The shell 10 is of a frame shape, and a hole of a quadrangular cross section is formed in the shell 10 so as to penetrate the shell 10 in the thickness direction. The cross section of the hole in the shell 10 has the length of approximately 18 mm in the longitudinal direction of the die unit, and the length of approximately 23 mm in the lateral direction of the die unit. The hole of the shell 10 is formed near one end face with respect to the central portion of the shell 10. Four faces forming an inside surface 13 of the shell 10 are parallel to the Z-direction and to the respectively corresponding side faces of the shell 10. Screw holes 14 for fixing the shell 10 are formed in the shell 10.

A first through hole 16 penetrating the shell 10 is formed in the shell 10. The first through hole 16 opens in an outside surface 15 and in the face of the inside surface 13 parallel to the outside surface 15. The depth direction of the first through hole 16 is perpendicular to the outside surface 15 and to the Z-direction. A sectional shape of the first through hole 16 is an oblong, the longitudinal length of the oblong is approximately 7 mm, and the length in the transverse direction is approximately 1.5 mm.

The die 20 is located inside the shell 10 and the die hole 3 is formed therein. The die 20 is of a rectangular parallelepiped shape corresponding to the hole formed in the shell 10, and outside surfaces of the die 20 are each in contact with the inside surface 13 of the shell 10. The four faces of the inside surface of the die 20, i.e., the four surfaces defining the die hole 3 are formed in parallel with the respectively corresponding faces of the inside surface 13 of the shell 10, and are parallel each to the Z-direction. Each of the four surfaces defining the die hole 3 is perpendicular to its adjoining surfaces.

Figure 2:
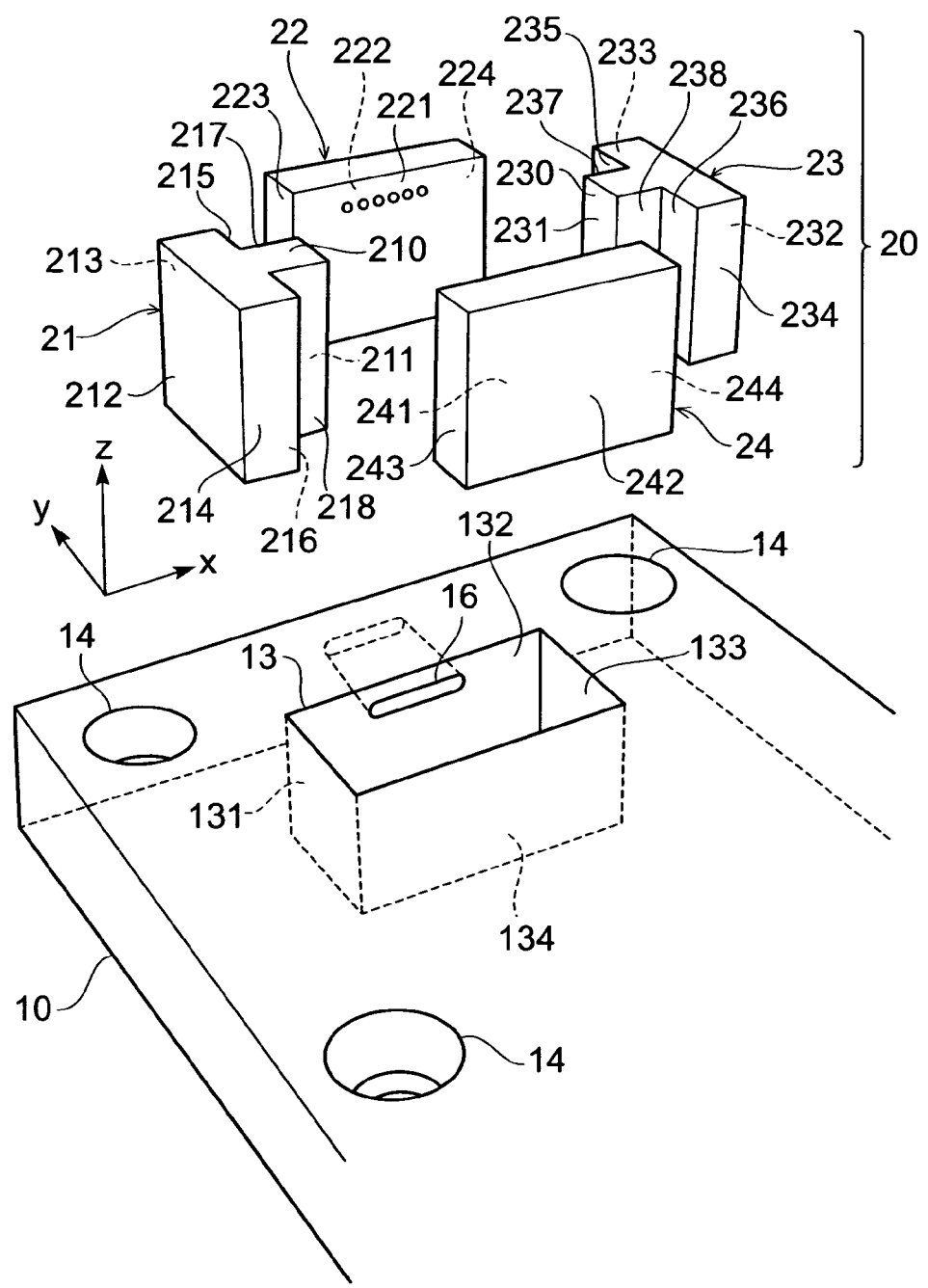
FIG. 2 is an exploded perspective view of the die unit according to the embodiment.
Figure 3:
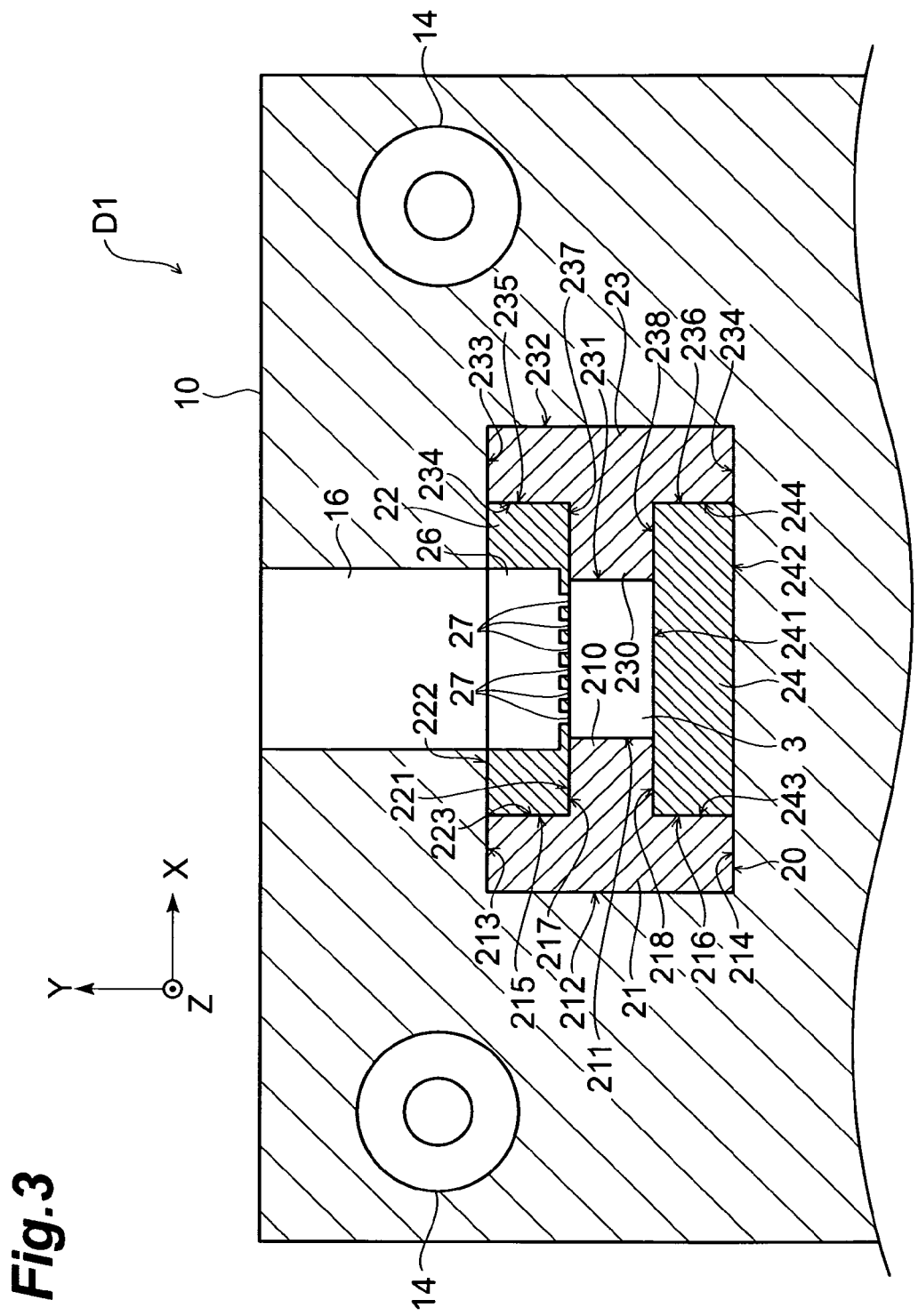
FIG. 3 is a sectional view of the die unit according to the embodiment.

The die 20 has first to fourth members 21-24 divided in the directions normal to the Z-direction. The die 20 will be described in more detail with reference to FIGS. 2 and 3. FIG. 2 is an exploded perspective view of the die unit according to the present embodiment. FIG. 3 is a sectional view of the die unit according to the present embodiment. FIG. 3 is a sectional view normal to the Z-direction of the die unit D1. In FIGS. 2 and 3, a Y-direction is defined along the longitudinal direction of the die unit D1, and an X-direction along the direction normal to the Y-direction and to the Z-direction.

The first member 21 is mainly in contact with one inside surface 131 adjacent to an inside surface 132 where the first through hole 16 of the shell 10 opens. The second member 22 is in contact with the inside surface 132 where the first through hole 16 of the shell 10 opens. The third member 23 is mainly in contact with another inside surface 133 adjacent to the inside surface 132. The fourth member 24 is in contact with an inside surface 134 facing the inside surface 132 of the shell 10.

The first member 21 and the third member 23 are of the same shape. The first member 21 and the third member 23 are columnar members whose sectional shape is a T-shape when cut by a plane normal to the Z-axis. The first member 21 and the third member 23 are symmetric with respect to the center line. The first member 21 and the third member 23 have their respective projections 210, 230. The first member 21 and the third member 23 have their respective inside surfaces 211, 231 defining the die hole 3 and facing each other, as end faces of the projections 210, 230.

The side faces of the first member 21 are composed of the inside surface 211, an outside surface 212 facing the inside surface 211, side surfaces 213, 214 perpendicularly adjacent to the outside surface 212, a side surface 215 perpendicularly adjacent to the side surface 213 and parallel to the inside surface 211, a side surface 216 perpendicularly adjacent to the side surface 214 and parallel to the inside surface 211, and side surfaces 217, 218 perpendicularly adjacent to the inside surface 211. The outside surface 212 of the first member 21 is in contact with the inside surface 131 of the shell 10, and the side surface 213 and the side surface 214 of the first member 21 are in contact with the inside surface 132 and with the inside surface 134 of the shell 10, respectively.

The side faces of the third member 23 are composed of the inside surface 231, an outside surface 232 facing the inside surface 231, side surfaces 233, 234 perpendicularly adjacent to the outside surface 232, a side surface 235 perpendicularly adjacent to the side surface 233 and parallel to the inside surface 231, a side surface 236 perpendicularly adjacent to the side surface 234 and parallel to the inside surface 231, and side surfaces 237, 238 perpendicularly adjacent to the inside surface 231. The outside surface 232 of the third member 23 is in contact with the inside surface 133 of the shell 10, and the side surface 233 and the side surface 234 of the third member 23 are in contact with the inside surface 132 and with the inside surface 134 of the shell 10, respectively.

The second member 22 and the fourth member 24 are of a rectangular parallelepiped shape and their contour is the same shape. The second member 22 and the fourth member 24 include their respective inside surfaces 221, 241 defining the die hole 3 and facing each other.

The side faces of the second member 22 are composed of the inside surface 221, an outside surface 222 facing the inside surface 221, a side surface 223 in contact with the first member 21, and a side surface 224 in contact with the third member 23. The outside surface 222 of the second member 22 is in contact with the inside surface 132 of the shell 10 in which the first through hole 16 is formed.

The side faces of the fourth member 24 are composed of the inside surface 241, an outside surface 242 facing the inside surface 241, a side surface 243 in contact with the first member 21, and a side surface 244 in contact with the third member 23. The outside surface 242 of the fourth member 24 is in contact with the inside surface 134 of the shell 10.

The first member 21, which includes the inside surface 211 defining the die hole 3, and the second member 22, which includes the inside surface 221 defining the die hole 3, constitute a first portion. The third member 23, which includes the inside surface 231 defining the die hole 3, and the fourth member 24, which includes the inside surface 241 defining the die hole 3, constitute a second portion.

The side surface 215 of the first member 21 and the side surface 223 of the second member 22 have the same shape and the same area, and are in contact with each other. The side surface 217 of the first member 21 is in contact with an edge area of the inside surface 221 of the second member 22. The side surface 216 of the first member 21 and the side surface 243 of the fourth member 24 have the same shape and the same area, and are in contact with each other. The side surface 218 of the first member 21 is in contact with an edge area of the inside surface 241 of the fourth member 24. Namely, the projection 210 of the first member 21 is sandwiched between the inside surface 221 of the second member 22 and the inside surface 241 of the fourth member facing each other.

The side surface 235 of the third member 23 and the side surface 224 of the second member 22 have the same shape and the same area, and are in contact with each other. The side surface 237 of the third member 23 is in contact with an edge area of the inside surface 221 of the second member 22. The side surface 236 of the third member 23 and the side surface 244 of the fourth member 24 have the same shape and the same area, and are in contact with each other. The side surface 238 of the third member 23 is in contact with an edge area of the inside surface 241 of the fourth member 24. Namely, the projection 230 of the third member 23 is sandwiched between the inside surface 221 of the second member 22 and the inside surface 241 of the fourth member facing each other. Furthermore, the second member 22 and the fourth member 24 are sandwiched between the first member 21 and the third member 23.

The first to fourth members 21-24 are fitted in the shell 10 by shrinkage fit, and are fixed inside the shell 10. This results in pressing the first to fourth members 21-24 in the directions from the shell 10 toward the die hole 3.

The second member 22 is subject to a force from the inside surface 132 of the shell 10 to the die hole 3, and the fourth member 24 is subject to a force from the inside surface 134 of the shell 10 to the die hole 3. Therefore, a distance on the first member 21 side between the second member 22 and the fourth member 24 is defined by a distance between the side surface 217 and the side surface 218 of the first member 21. A distance on the third member 23 side between the second member 22 and the fourth member 24 is defined by a distance between the side surface 237 and the side surface 238 of the third member 23.

Y-directional positions of the second member 22 and the fourth member 24 relative to the shell 10 are defined by the projections 210, 230 of the first member 21 and the third member 23. Y-directional positions of the first member 21 and the third member 23 relative to the shell 10 are defined by sandwiching of the projection 210 of the first member 21 and the projection 230 of the third member 23 between the second member 22 and the fourth member 24.

The first member 21 is subject to a force from the inside surface 131 of the shell 10 to the die hole 3 and the third member 23 is subject to a force from the inside surface 133 of the shell 10 to the die hole 3. Therefore, an X-directional position of the second member 22 relative to the shell 10 is defined by sandwiching of the second member 22 between the side surface 215 of the first member 21 and the side surface 235 of the third member 23. An X-directional position of the fourth member 24 relative to the shell 10 is defined by sandwiching of the fourth member 24 between the side surface 216 of the first member 21 and the side surface 236 of the third member 23.

An X-directional position of the first member 21 relative to the shell 10 is defined by sandwiching of the first member 21 between the inside surface 131 of the shell 10 and the second and fourth members 22, 24. An X-directional position of the third member 23 relative to the shell 10 is defined by sandwiching of the third member 23 between the inside surface 133 of the shell 10 and the second and fourth members 22, 24.

As described above, the first to fourth members 21-24 are pressed in the directions from the shell 10 to the die hole 3, i.e., toward the inside of the shell 10, whereby they are fixed without positional deviation from each other in the X-direction and in the Y-direction perpendicular to the Z-direction.

The side surfaces of the first to fourth members 21-24 are the inside surfaces 211, 221, 231, 241 of the first to fourth members 21-24 forming the die hole 3 and the surfaces perpendicular or parallel to the inside surfaces 131-134 of the shell 10. Therefore, the members can be fixed with better accuracy in the positions relative to each other.

The inside surface 221 of the second member 22 is in contact with the side surface 217 forming the projection 210 of the first member 21 and with the corner between the side surface 217 and the side surface 211 to form one corner of the die hole 3. Namely, since the inside surface 221 of the second member 22 is in contact with the side surface 217 of the first member 21, one corner of the die hole 3 is formed by the inside surface 221 of the second member 22 and the side surface 211 of the first member 21.

The inside surface 221 of the second member 22 is in contact with the side surface 237 forming the projection 230 of the third member 23 and with the corner between the side surface 237 and the side surface 231 to form one corner of the die hole 3. Namely, since the inside surface 221 of the second member 22 is in contact with the side surface 237 of the third member 23, one corner of the die hole 3 is formed by the inside surface 221 of the second member 22 and the side surface 231 of the third member 23.

The inside surface 241 of the fourth member 24 is in contact with the side surface 218 forming the projection 210 of the first member 21 and with the corner between the side surface 218 and the side surface 211 to form one corner of the die hole 3. Namely, since the inside surface 241 of the fourth member 24 is in contact with the side surface 218 of the first member 21, one corner of the die hole 3 is formed by the inside surface 241 of the fourth member 24 and the side surface 211 of the first member 21.

The inside surface 241 of the fourth member 24 is in contact with the side surface 238 forming the projection 230 of the third member 23 and with the corner between the side surface 238 and the side surface 231 to form one corner of the die hole 3. Namely, since the inside surface 241 of the fourth member 24 is in contact with the side surface 238 of the third member 23, one corner of the die hole 3 is formed by the inside surface 241 of the fourth member 24 and the side surface 231 of the third member 23.

The corners of the die hole 3, each of which is formed by contact of a surface of one member with a corner of another member as described above, can be formed so as to be sharper and more accurate than corners of die hole 3 formed by machining one member.

Figure 4:
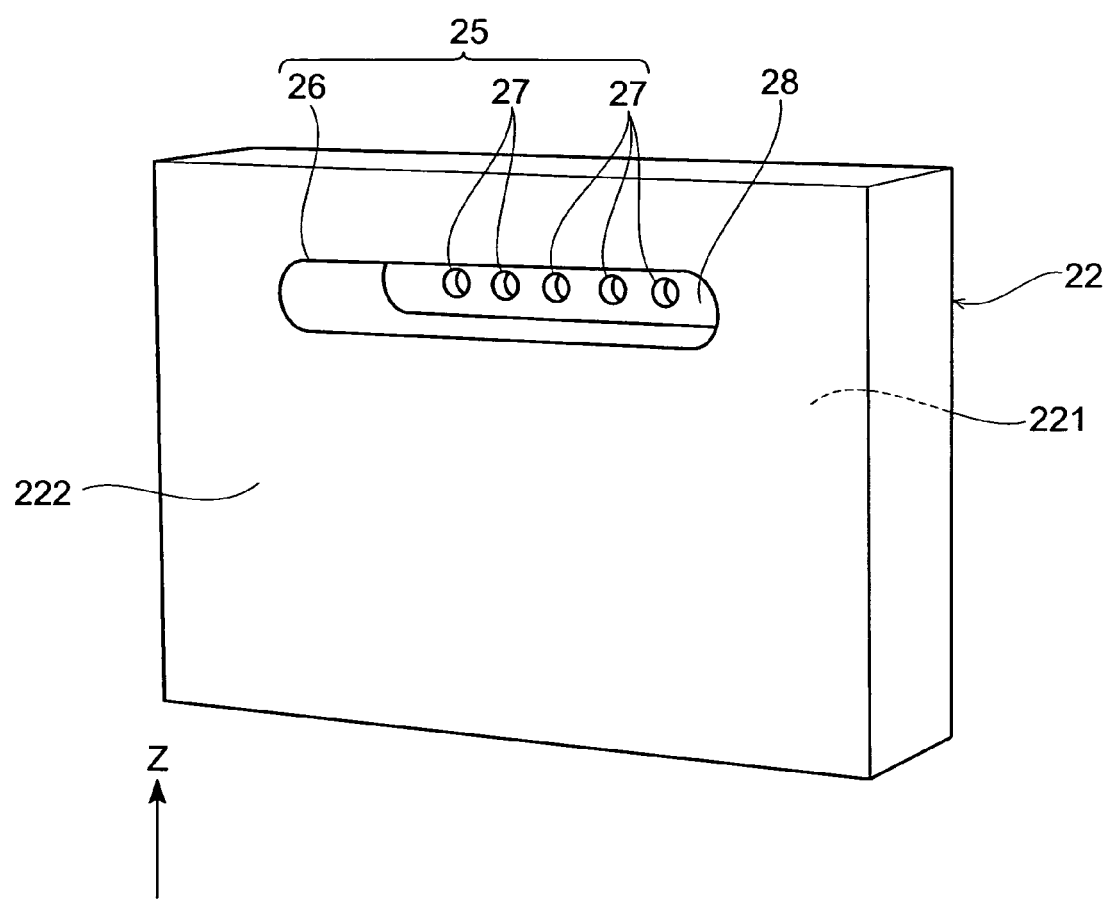
FIG. 4 is a perspective view of a first member in the die unit according to the embodiment.

Subsequently, the second member 22 will be described in further detail with reference to FIGS. 3 and 4. FIG. 4 is a perspective view of the second member. A through hole (second through hole) 25 continuing to the first through hole 16 of the shell 10 is formed in the second member 22 and at the position corresponding to the first through hole 16 of the shell 10, in the outside surface 222. The second through hole 25 includes a first region 26 and a plurality of second regions 27.

The first region 26 opens in the side surface 222 in contact with the inside surface 13 of the shell 10 and is a region whose sectional shape is oblong. The sectional shape of the first region 26 is the same as the sectional shape of the first through hole 16. The second regions 27 open in the inside surface 221 defining the die hole 3 and are regions whose sectional shape is circular.

The first region 26 has the oblong sectional shape. The first region 26 has the longitudinal length of about 7 mm and the length of about 1.5 mm in the transverse direction, and the depth of the first region 26 is approximately 5.5 mm. The second regions 27 have the circular sectional shape having the diameter of about 0.2 mm and the depth of the second regions 27 is approximately 0.5 mm. Namely, a sectional area of the first region 26 is larger than a sectional area of the second regions 27.

There are six second regions 27 formed so as to continue to the first region 26. The second regions 27 are arranged on a line along the major axis direction of the oblong shape being the sectional shape of the first region 26. Namely, the first through hole 16 and, the first region 26 and the second regions 27 of the second through hole 25 form a through hole opening in the outside surface of the die unit D1 and in the surface defining the die hole 3.

The first region 26 serves as a hole connecting the plurality of second regions 27. The first region 26 and second regions 27 constitute a stepped hole penetrating the second member 22 in the direction perpendicular to the Z-direction.

The die unit D1 of the present embodiment can be fabricated as described below. First prepared are the shell 10 in which the first through hole 16 is formed, and each of the first to fourth members 21-24 shaped in their respective contours. Then the first region 26 is formed from the outside surface 222 of the second member 22. Since the accuracy of this first region 26 does not affect the accuracy of a molded compact, the first region 26 can be formed relatively easily.

The second regions 27 are then formed by electro-discharge machining from the inside surface 221 side of the second member 22. The sectional shape of the second regions 27 is required to be formed relatively accurately, but can be machined easier because the depth of the second regions 27 is smaller than the thickness of the second member 22. Since the die 20 is split into the first to fourth members 21-24, the second regions 27 can be formed from the inside surface 221 of the second member 22 and the second regions 27 can be formed more easily and accurately.

Thereafter, the first to fourth members 21-24 are combined and are subjected to shrinkage fit in the shell 10, whereby the first to fourth members 21-24 are fixed to form the die 20, thereby forming the die unit D1.

Figure 5:
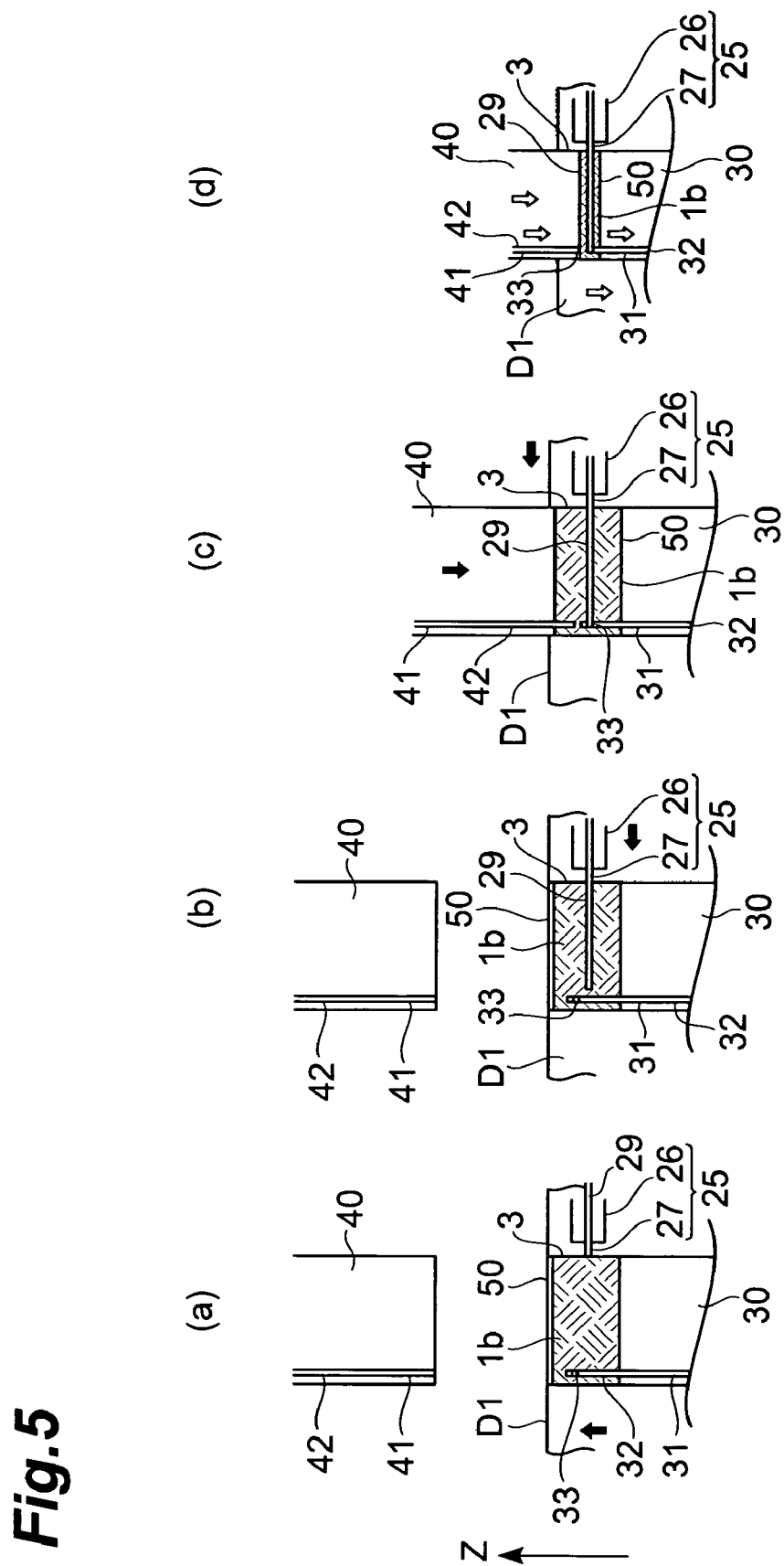
FIG. 5 is sectional views for explaining molding steps using the die unit according to the present embodiment.

Subsequently, how to use the die unit D1 will be described with reference to FIG. 5. FIG. 5 is sectional views for explaining molding steps using the die unit according to the present embodiment. The die unit D1 is used together with a lower punch 30 and an upper punch 40 vertically slidable along the inner surface of the die hole 3 (i.e., movable up and down in the die hole 3), to form a powder compact P.

The die unit D1 is provided with lateral pins 29 in a slidable state in the direction perpendicular to the Z-direction, in the lateral pin hole 28 constituted by the first through hole 16 and the second through hole 25. The lateral pins 29 can be moved in the direction perpendicular to the Z-direction from a storage state in which their tip faces are aligned with the inner surface of the die hole 3, to project out inside the die hole 3.

Vertical pin holes 31 penetrating in the Z-direction are formed in the lower punch 30. Lower vertical pins 32 are provided in a vertically slidable state (movable up and down) in the vertical pin holes 31. The lower vertical pins 32 are movable from a storage state in which they are aligned with the upper surface of the lower punch 30 (or they are below the upper surface), into a projecting state from the upper surface. The lower vertical pins 32 are perpendicular to the lateral pins 29 and each lower vertical pin 32 has an engagement hole 33 into which a lateral pin 29 can be inserted.

Vertical pin holes 41 are formed in the upper punch 40. Upper vertical pins 42 are provided in a vertically slidable state (movable up and down) in the vertical pin holes 41. The upper vertical pins 42 are movable from a storage state in which they are aligned with the lower surface of the upper punch 40 (or they are above the lower surface), into a state in which they project out from the lower surface. The upper vertical pins 42 have the same sectional shape as the lower vertical pins 32.

A plurality of sets of lateral pins 29 and vertical pins 32, 42 are provided in the same die assembly for the purpose of forming a plurality of approximately L-shaped holes in the powder compact P.

Next, production steps of the powder compact using the above-described molding die assembly will be described below with reference to FIG. 5. In the drawing black arrows indicate motions of respective members, and outline arrows pressing directions. The present embodiment will describe the withdrawal method (in which the lower punch 30 is fixed, the upper punch 40 and the die unit D1 are lowered, and the powder is compacted by the lower punch 30 and the upper punch 40 by making use of a relative speed difference).

First, as shown in FIG. 5(*a*), the lower punch 30 is brought from the bottom into the die hole 3 of the die unit D1, to form a cup-shaped cavity 50 opening up. The tip faces of the lateral pins 29 are aligned with the side face defining the die hole 3, to keep the lateral pins 29 in the storage state, and the lower vertical pins 32 are brought into a projecting state from the upper surface of the lower punch 30. Then a powder material 1b is filled.

As shown in FIG. 5(b), the lateral pins 29 are slid in the lateral pin hole 28 and are projected out from the lateral pin hole 28 to a position where they are close to the lower vertical pins 32 projecting upward in the cavity 50 (just before a position where they are coupled (contact)). Then, as shown in FIG. 5(c), the upper punch 40 is lowered to the surface of the powder material filled in the cavity 50. Then the lateral pins 29 are laterally slid and further projected out, so that the tip portions of the lateral pins 29 come to be engaged and coupled with the engagement holes 33 (through holes) in the upper portions of the lower vertical pins 32.

As shown in FIG. 5(d), while maintaining the position of the lower punch 30, a pressure is applied to each of the die unit D1 and the upper punch 40 by a CNC press molder. At the same time, in a state of a powder compact P resulting from compacting of the powder material in the cavity 50, the positions of the die unit D1, lower vertical pins 32, upper punch 40, and upper vertical pins 42 are controlled so that the centers of the lateral pins 29 are located in a neutral zone of the powder compact P. Namely, each second region 27 is formed so as to be located in the central portion in the Z-direction in the cavity space formed during molding.

Thereafter, while the molding pressure applied to each of the die unit D1, lower punch 30, and upper punch 40 is released (the powder compact P is held under a moderate low pressure), the lateral pins 29 in engagement with the engagement holes 33 of the lower vertical pins 32 are drawn out of the powder compact and retracted into the lateral pin hole 28 of the die unit D1. The powder compact is molded in this manner. The lateral pin hole 28 formed in the die unit D1 was used as a hole for insertion of the lateral pins 29, but may also be utilized as a hole for insertion of a thermometer.

Figure 6:
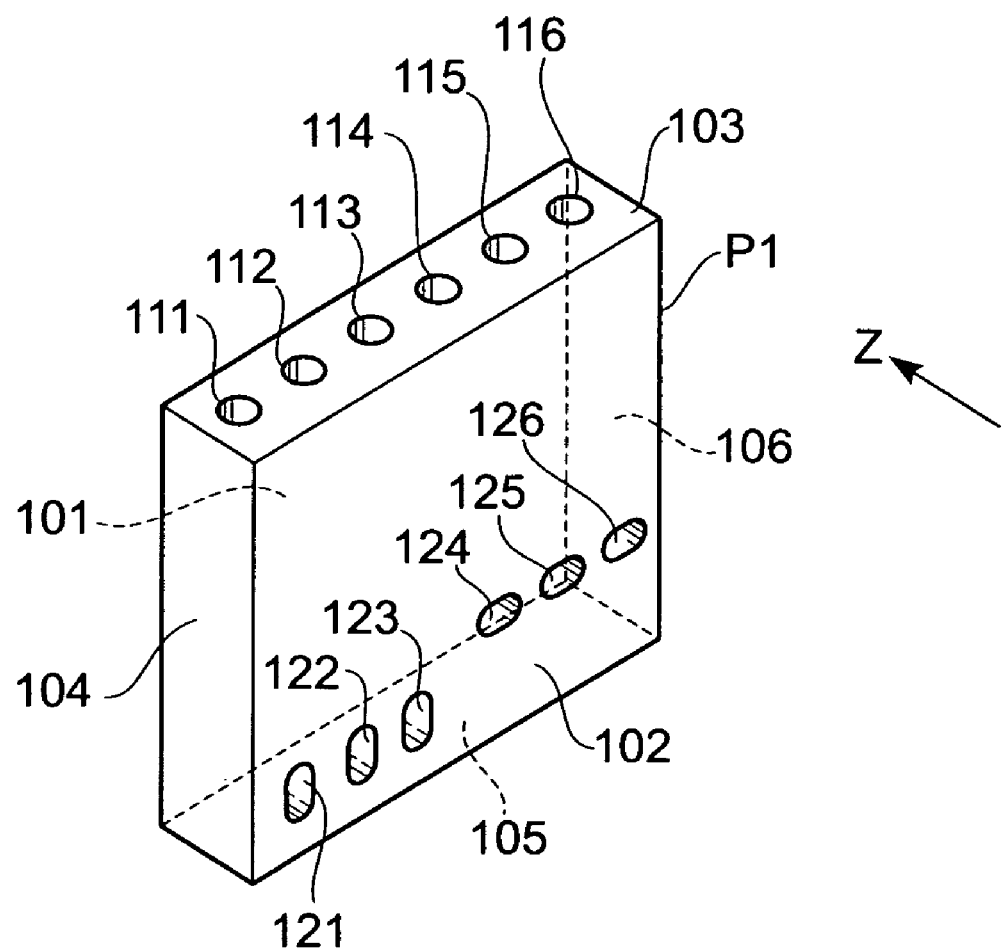
FIG. 6 is a perspective view of a powder compact molded by a die assembly for powder compacting including the die unit according to the present embodiment.

FIG. 6 shows a powder compact P molded by use of the die unit D1 of the present embodiment as described above. FIG. 6 is a perspective view of the powder compact. The powder compact P is, for example, a powder compact used in a resonator, a transmitter, a dielectric filter, a duplexer, or the like. The powder compact P has an upper surface 101 and a lower surface 102, which are perpendicular to the Z-direction and which face each other, and first to fourth side surfaces 103-106 parallel to the press direction.

A plurality of lateral holes 111-116 (six holes in the present embodiment) perpendicular to the first side surface 103 open in the first side surface 103. The lateral holes 111-116 have a circular cross section and the diameter of about 0.2 mm. The lateral holes 111-116 open as aligned on a line in the central region in the Z-direction in the first side surface 103. Namely, the lateral holes 111-116 are formed as aligned on a line along the direction perpendicular to the Z-direction in the first side surface 103.

Vertical holes 121-126 open in the lower surface 102 and near the side surface 105 facing the first side surface 103. Each of the vertical holes 121-126 is formed so as to extend in the direction perpendicular to the lower surface 102 and to connect to the corresponding lateral hole 111-116. Namely, six approximately L-shaped communicating holes are formed by the lateral holes 111-116 and the vertical holes 121-126 in the powder compact P.

The upper surface 101 and the lower surface 102 of the powder compact P are formed by the lower surface of the upper punch and the upper surface of the lower punch, respectively, in the die assembly. The vertical holes 121-126 formed in the lower surface 102 are made by the vertical pins projecting from the lower punch. The side surfaces 103-106 of the powder compact P are made by the inside faces of the die hole 3 in the die unit D1. The lateral holes 111-116 of the powder compact P are made by the lateral pins 29 projecting from the inside surface of the die hole 3 into the cavity.

Subsequently, the operational effects of the die unit D1 according to the present embodiment will be described. In the die unit D1, the second through hole 25 includes the first region 26 and the second regions 27 smaller than the sectional area of the first region 26, and thus the machining length for formation of the thinner second regions 27 is smaller than the distance between the outside surface 222 of the die 20 and the inside surface 221 defining the die hole 3. Therefore, an improvement is made in machinability of the through hole opening in the outside surface of the die unit D1 and in the surface defining the die hole 3.

The first to fourth members 21-24 constituting the die 20 define the die hole 3 and include the mutually opposed surfaces. For forming the die 20, the first to fourth members 21-24 each are machined. Therefore, the second regions 27 of the second through hole 25 in the first member 21 can be machined from the inside surface 22 of the die 20, so that the second regions 27 of the second through hole 25 can be machined easier.

Since the die 20 of the die unit D1 is fitted inside the shell 10 by shrinkage fit, the first to fourth members 21-24 constituting the die 20 can be fixed without deviation against pressure during molding. Therefore, it becomes feasible to securely maintain the shape of the die hole 3.

The first to fourth members 21-24 constituting the die 20 are shrinkage-fitted in the shell 10 in the state in which each of the projections 210, 230 of the first and third members 21, 23 is sandwiched between the inside surfaces 221, 241. For this reason, the first to fourth members 21-24 are fixed to each other without deviation in position during molding. Therefore, the first to fourth members 21-24 constituting the die 20 can form the accurate die hole 3.

Since each of the projections 210, 230 is sandwiched between the inside surfaces 221, 241, the corners of the die hole 3 are formed by the inside surfaces 221, 241 and the corners of the projections 210, 230. Therefore, the corners of the die hole 3 can be formed more accurately than in the case where the corners are formed in one member or in the case where the corners are formed by corners of respective members.

The sectional shape of the first region 26 is oblong, the second through hole 25 includes the plurality of second regions 27, and the plurality of second regions 27 are arranged along the major axis direction of the oblong shape being the sectional shape of the first region 26. This permits the plurality of second regions 27 to be efficiently arranged.

Figure 7:
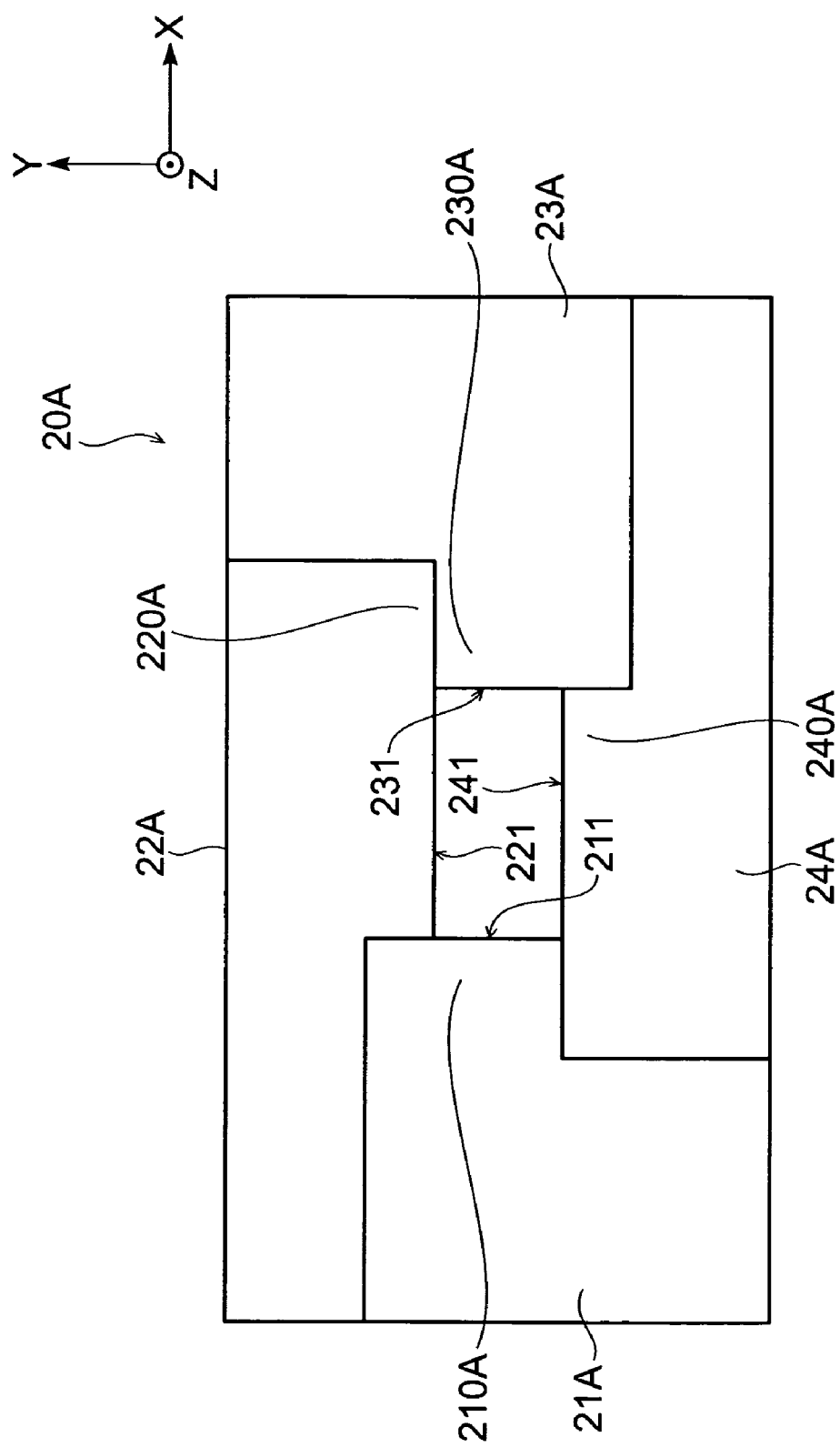
FIG. 7 is a sectional view showing a modification example of the die in the die unit according to the embodiment.
Figure 8:
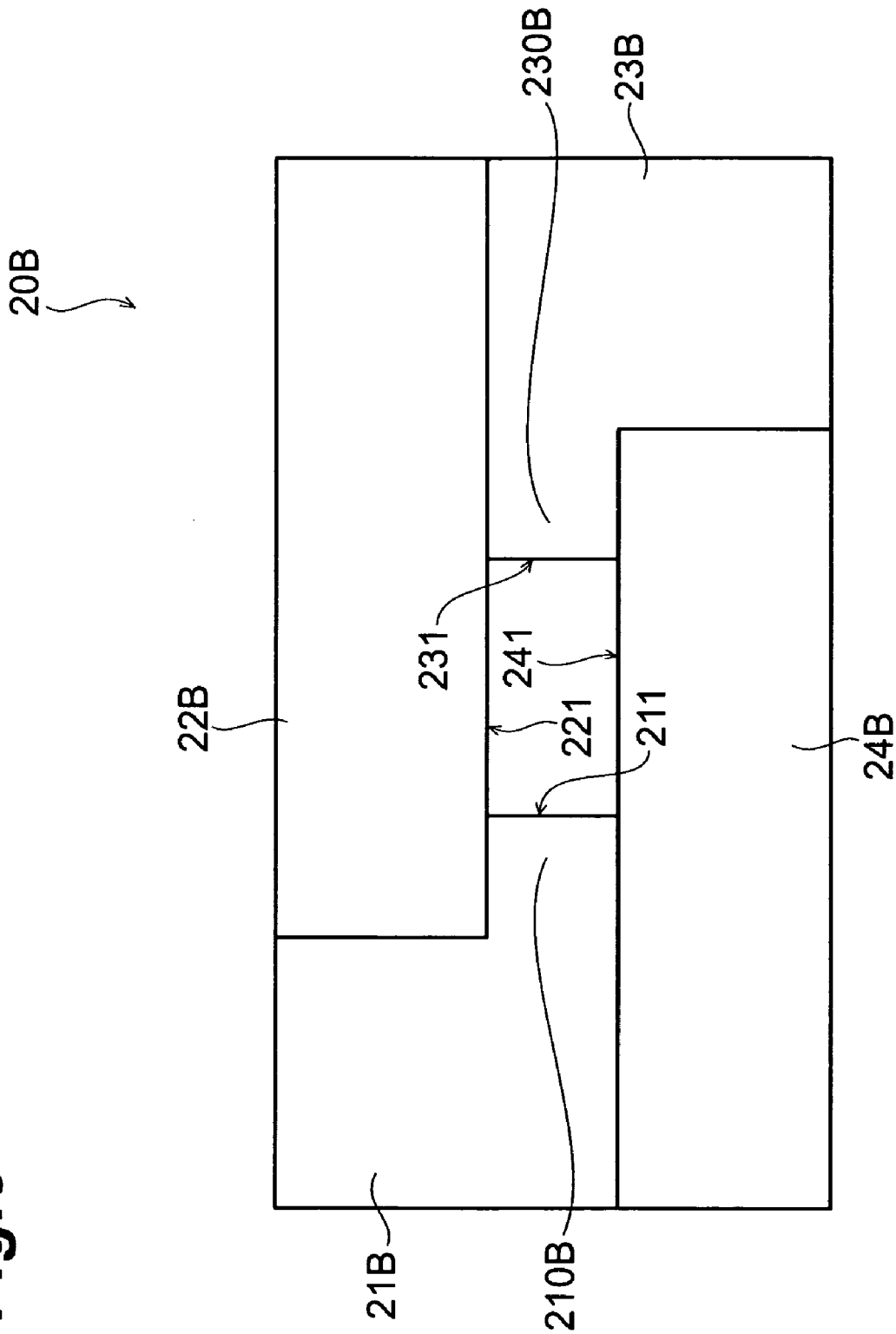
FIG. 8 is a sectional view showing a modification example of the die in the die unit according to the embodiment.

The present invention is by no means limited to the above embodiment, but can be modified in various ways. For example, the contours of the first to fourth members constituting the die may be arranged as shown in FIGS. 7 and 8. FIGS. 7 and 8 are sectional views showing modification examples of the die included in the die unit according to the present embodiment. FIGS. 7 and 8 are depicted without hatching indicating cross-sectional surfaces, for easier understanding of the drawings.

The die 20A shown in FIG. 7 has a first member 21A, a third member 23A, a second member 22A, and a fourth member 24A. The first member 21A includes an inside surface 211 and the third member 23A does an inside surface 231. The inside surface 211 and the inside surface 231 define the die hole 3 and face each other. The second member 22A includes an inside surface 221 and the fourth member 24A does an inside surface 241. The inside surface 221 and the inside surface 241 define the die hole 3 and face each other. Namely, the die hole 3 is defined by the four inside surfaces 211, 221, 231, and 241. The contours of the first to fourth members 21A-24A are of an L-shaped cross section, when cut by a plane normal to the Z-axis, and are columnar. The first to fourth members 21A-24A have their respective projections 210A, 220A, 230A, and 240A including the respective inside surfaces 211, 221, 231, and 241.

The first member 21A and the third member 23A have the same shape. The first member 21A and the third member 23A are arranged opposite to each other and mutually in point symmetry with respect to the center of the die hole 3 in FIG. 7. The second member 22A and the fourth member 24A have the same shape. The second member 22A and the fourth member 24A are arranged mutually in point symmetry with respect to the center of the die hole 3 in FIG. 7.

The projection 210A of the first member 21A is sandwiched between the second member 22A and the inside surface 241 of the fourth member 24A, and the first member 21A is sandwiched between the second and fourth members 22A, 24A and the inside surface 13 of the shell 10. This results in fixing the first member 21A in the X-direction and in the Y-direction. The projection 220A of the second member 22A is sandwiched between the inside surface 211 of the first member 21A and the third member 23A, and the second member 22A is sandwiched between the first and third members 21A, 23A and the inside surface 13 of the shell 10. This results in fixing the second member 22A in the X-direction and in the Y-direction.

The projection 230A of the third member 23A is sandwiched between the inside surface 221 of the second member 22A and the fourth member 24A, and the third member 23A is sandwiched between the second and fourth members 22A, 24A and the inside surface 13 of the shell 10. This results in fixing the third member 23A in the X-direction and in the Y-direction. The projection 240A of the fourth member 24A is sandwiched between the first member 21A and the inside surface 231 of the third member 23A, and the fourth member 24A is sandwiched between the first and third members 21A, 23A and the inside surface 13 of the shell 10. This results in fixing the fourth member 24A in the X-direction and in the Y-direction.

As described above, the first to fourth members 21A-24A constituting the die 20A are shrinkage-fitted in the shell 10 in a state in which each of the projections 210A, 220A, 230A, and 240A of the first to fourth members 21A-24A is sandwiched between each set of the inside surfaces 211, 221, 231, 241 and the first to fourth members 21A-24A. For this reason, the first to fourth members 21A-24A are fixed to each other without deviation in position during molding. Therefore, the first to fourth members 21A-24A constituting the die 20A can form the accurate die hole 3.

Since each of the projections 210A, 220A, 230A, and 240A is sandwiched by the inside surfaces 211, 221, 231, 241, the corners of the die hole 3 are formed by the inside surfaces 211, 221, 231, 241 and the corners of the projections 210A, 220A, 230A, 240A. Therefore, the corners of the die hole 3 can be formed more accurately than in the case where the corners are formed in one member or in the case where the corners are formed by corners of respective members.

The die 20B shown in FIG. 8 has a first member 21B, a third member 23B, a second member 22B, and a fourth member 24B. The first member 21B includes an inside surface 211 and the third member 23B includes an inside surface 231. The inside surface 211 and the inside surface 231 define the die hole 3 and face each other. The second member 22B includes an inside surface 221 and the fourth member 24B includes an inside surface 241. The inside surface 221 and the inside surface 241 define the die hole 3 and face each other.

The second member 22B and the fourth member 24B are of a rectangular parallelepiped shape and have the same shape. The second member 22B and the fourth member 24B are arranged opposite to each other and mutually in point symmetry with respect to the center of the die hole 3 in FIG. 8. The first member 21B and the third member 23B are columnar members which have an L-shaped cross section when cut by a plane normal to the Z-axis. The first member 21B and the third member 23B are arranged opposite to each other and mutually in point symmetry with respect to the center of the die hole 3 in FIG. 8. The first member 21B and the third member 23B have their respective projections 210B, 230B including the respective inside surfaces 211, 231.

The projection 210B of the first member 21B is sandwiched between the inside surface 221 included in the second member 22B and the inside surface 241 included in the fourth member 24B. The inside surface 221 and the inside surface 241 face each other. The first member 21B is sandwiched between the second member 22B and the inside surface 13 of the shell 10. Therefore, the first member 21B is fixed in the X-direction and in the Y-direction.

The projection 230B of the third member 23B is sandwiched between the inside surface 221 included in the second member 22B and the inside surface 241 included in the fourth member 24B. The inside surface 221 and the inside surface 241 face each other. The third member 23B is sandwiched between the fourth member 24B and the inside surface 13 of the shell 10. Therefore, the third member 23B is fixed in the X-direction and in the Y-direction.

The second member 22B is sandwiched between the first and third members 21B, 23B and the inside surface 13 of the shell 10 and is thus fixed in the X-direction and in the Y-direction. The fourth member 24B is sandwiched between the first and third members 21B, 23B and the inside surface 13 of the shell 10 and is thus fixed in the X-direction and in the Y-direction.

As described above, the first to fourth members 21B-24B constituting the die 20B are shrinkage-fitted in the shell 10 in a state in which each of the projections 210B, 230B of the first and third members 21B, 23B is sandwiched between the inside surfaces 221, 241. For this reason, the first to fourth members 21B-24B are fixed to each other without deviation in position during molding. Therefore, the first to fourth members 21B-24B constituting the die 20B can form the accurate die hole 3.

Since each of the projections 210B, 230B is sandwiched between the inside surfaces 221, 241, the corners of the die hole 3 are formed by the inside surfaces 221, 241 and the corners of the projections 210B, 230B. Therefore, the corners of the die hole 3 can be formed more accurately than in the case where they are formed in one member or in the case where they are formed by corners of respective members.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A molding die unit comprising:
   a shell; and
   a die which is located inside the shell and in which a die hole is formed;

wherein the die has first and second portions comprising respective surfaces defining the die hole and facing each other;

wherein a first through hole is formed in the shell and penetrates the shell so as to open in an outside surface and in an inside surface;

wherein a second through hole continuing to the first through hole is formed in the first portion; and wherein the second through hole comprises a first region which opens in a surface of the first portion facing the inside surface of the shell and which has a first sectional area, and a second region which opens in said surface defining the die hole and which has a second sectional area smaller than the first sectional area.

2. The molding die unit according to claim 1,
wherein the die is located inside the shell by shrinkage fit.

3. The molding die unit according to claim 2,
wherein the first and second portions further comprise respective surfaces which define the die hole, which are perpendicular to the aforementioned surfaces facing each other, and which face each other;

wherein the first portion is comprised of a first member comprising one of the two surfaces defining the die hole, and a second member comprising the other of the two surfaces defining the die hole;

wherein the second portion is comprised of a third member comprising one of the two surfaces defining the die hole, and a fourth member comprising the other of the two surfaces defining the die hole;

wherein the first and third members have their respective projections each of which comprises said one surface;

wherein the first to fourth members are fitted in the shell by shrinkage fit in a state in which each of the projections is sandwiched between the other surfaces.

4. The molding die unit according to claim 1,
wherein a sectional shape of the first region is an oblong;
wherein the second through hole comprises a plurality of said second regions;
wherein the plurality of second regions are arranged along a major axis direction of the oblong being the sectional shape of the first region.

* * * * *